US009732492B2

(12) United States Patent
Ahlberg et al.

(10) Patent No.: US 9,732,492 B2
(45) Date of Patent: Aug. 15, 2017

(54) SITU TREATMENT SYSTEM AND METHOD FOR DEWATERING AND STABILIZATION OF WASTE MATERIAL DEPOSITS IN WASTE IMPOUNDMENTS

(71) Applicant: BlackRock Engineers, Inc., Wilmington, NC (US)

(72) Inventors: Gary Ahlberg, Wilmington, NC (US); William Lupi, Wilmington, NC (US); Nicholas Parks, Wilmington, NC (US)

(73) Assignee: BlackRock Engineers, Inc., Wilmington, NC (US)

( * ) Notice: Subject to any disclaimer, the term of this patent is extended or adjusted under 35 U.S.C. 154(b) by 0 days.

(21) Appl. No.: 15/381,791

(22) Filed: Dec. 16, 2016

(65) Prior Publication Data

US 2017/0121925 A1    May 4, 2017

Related U.S. Application Data

(63) Continuation of application No. 14/693,398, filed on Apr. 22, 2015, now Pat. No. 9,556,579.

(51) Int. Cl.

| | |
|---|---|
| *B09C 1/02* | (2006.01) |
| *E02D 3/00* | (2006.01) |
| *C02F 1/00* | (2006.01) |
| *B01D 24/02* | (2006.01) |
| *B01D 36/02* | (2006.01) |

(Continued)

(52) U.S. Cl.
CPC .............. *E02D 3/00* (2013.01); *B01D 24/02* (2013.01); *B01D 36/02* (2013.01); *B09C 1/02* (2013.01); *C02F 1/004* (2013.01); *E02D 31/004* (2013.01); *B01D 2101/04* (2013.01); *C02F 2001/007* (2013.01); *C02F 2103/06* (2013.01);

(Continued)

(58) Field of Classification Search
CPC ....................................................... B09C 1/002
See application file for complete search history.

(56) References Cited

U.S. PATENT DOCUMENTS

| 4,810,131 A * | 3/1989 | Turner ...................... E02B 3/16 |
| | | 210/170.01 |
| 9,556,579 B2 * | 1/2017 | Ahlberg ................... E02D 3/00 |

(Continued)

*Primary Examiner* — Sunil Singh
(74) *Attorney, Agent, or Firm* — Rockman Videbeck & O'Connor

(57) ABSTRACT

A system and method for in situ dewatering and stabilizing waste material deposits previously created from sluicing into a waste impoundment. The method includes access for installation of wells and grading for surface drainage and storm water control. If free water is present, primary dewatering siphons or decants the free water in the pond. The system includes vertical dewatering well installation that requires drilling, well completion materials for filtering leachate, and well pump installation for removing leachate from the well. Collection piping collects leachate from the wells and transfers the leachate to a discharge solution. The dewatering operation collects and removes leachate from the pond ash deposit and impoundment, reuses or treats the leachate at a discharge solution, remediates contaminants and/or hydraulic head in the impoundment, and consolidates and stabilizes the dewatered solids. Impoundment closure includes horizontal drains, final grading, final cover or overfill landfill development, and post closure.

38 Claims, 8 Drawing Sheets

(51) Int. Cl.
*E02D 31/00* (2006.01)
*C02F 103/06* (2006.01)
*C02F 103/10* (2006.01)

(52) U.S. Cl.
CPC ...... *C02F 2103/10* (2013.01); *C02F 2209/42* (2013.01); *C02F 2307/00* (2013.01)

(56) References Cited

U.S. PATENT DOCUMENTS

2010/0200516 A1\* 8/2010 Hwang .................. B09B 1/006
  405/117
2013/0101353 A1\* 4/2013 Bousquet ................ B09C 1/005
  405/128.3

\* cited by examiner

SITU TREATMENT SYSTEM AND METHOD FOR DEWATERING AND STABILIZATION OF WASTE MATERIAL DEPOSITS IN WASTE IMPOUNDMENTS

This application claims priority to and is a continuation of U.S. Non-provisional patent application Ser. No. 14/693,398, filed Apr. 22, 2015, to the extent allowed by law.

BACKGROUND OF THE INVENTION

Field of the Invention

The present invention relates generally to a system and method for dewatering and stabilization system, and more particularly, to a system and method for in situ dewatering and stabilizing saturated coal ash and other coal combustion residuals or similar waste material deposits previously created from sluicing into an ash basin or similar waste impoundment.

Description of the Prior Art

Impoundments have been utilized in the mining industry and power industry for disposal of waste products generated from the mining and burning of coal prior to the 1960's. Coal fired power plants have historically used basins or impoundments to contain and store waste products generated by the coal combustion process. Ash basins were designed to settle the coal ash and other coal combustion residual (CCR) solids and decant the water to adjoining surface water through a discharge structure. Deposited CCRs are typically saturated and layered, the accumulated layers described as pond ash deposit. The water level within the constructed embankments and the pond ash deposit is described as the phreatic surface, which may be perched or connected to the local groundwater level in surrounding soils and bedrock. Accordingly, the components of an ash basin typically include free water on top of the pond ash deposits and ponded around the outlet structure, leachate within the saturated pond ash deposit, and pond ash solids. The CCR materials accumulate in a pond ash deposit and remain in an undrained, saturated condition that is typically very loose or soft.

Historically, ash basins were constructed at a time when groundwater monitoring requirements and groundwater protections were not routinely required. Environmental impacts from existing ash basins have typically occurred in the foundation soils and rock materials adjoining the basins. The environmental risks posed by existing impoundments typically involve the migration of water with concentrated heavy metals, sulfates, chlorides, total dissolved solids, or total suspended solids to adjoining surface water or groundwater.

During most of their useful life, ash basins remain passive facilities and only receive the work necessary to maintain the basin embankments and the flow path to the outlet structure. As the basin approaches its storage capacity, shallow dewatering, excavating and/or dredging activities have been used to relocate or stack pond ash to improve settlement and storage conditions within the basin. After excavation, the leachate drains from stacked pond ash leaving drier, unsaturated ash materials. The stacked ash is more dense and stable than the sluiced ash and supports heavy equipment loads. Conversely, the adjoining unimproved pond ash deposit is subject to failure under excessive static load conditions or could liquefy or spread laterally from vibration or earthquake conditions. Based on these observations and on laboratory testing of drained and undrained ash samples, consolidation and an increase in shear strength are the structural improvements needed for pond ash deposit stability.

The process treatment of the wastewater collected from an ash basin provides risk reduction for groundwater and surface water quality. Both passive and active methods for wastewater treatment to remove metals, total suspended solids and total dissolved solids have been successfully implemented in the mining and power industry. The water treatment methods to remove heavy metals from groundwater and coal wastewater have been successfully implemented for similar applications and new technologies are under development.

Existing CCR landfill overfills have been developed over historic pond ash deposits and provide added capacity for CCR disposal. For existing and new overfills, dewatered pond ash deposits improve the foundation conditions by consolidating the old pond ash deposits, which will increase the factor of safety for stability.

The current state of the art in dewatering ash basins includes excavating or dredging the pond ash, draining the leachate back to the pond, and moving the ash to a storage location. The pond ash is typically saturated when excavated and must be temporarily stacked to drain prior to loading the pond ash on trucks for hauling. Existing methods remove the leachate and ash together from below the phreatic surface to an elevated position where the leachate gravity drains from the pile, typically back into the basin. Dredging and pumping the ash-leachate slurry to process equipment for solid-liquid separation has been used to remove the pond ash deposit. With excavation or dredging, the existing methods disturb the pond ash deposit and remove the ash and leachate together. Unless the leachate accumulating in the pond during excavation is properly treated, environmental risks to surface water quality are increased during the excavation and drainage process.

The costs and emissions from an excavation or dredging operation to remove ash from an ash basin are significant. The weight of heavy construction equipment over saturated weak material and unstable conditions in the pond ash deposit is a general safety risk for conventional excavation on a pond ash deposit. In the mining industry there is a record of loss of life and equipment from these excavation activities. The safety risks are greater with increasing excavation depth.

The in situ treatment system for dewatering and stabilization of the present invention comprises a method to lower the phreatic surface with limited disturbance to the pond ash deposit for environmental risk reduction, remediation, and closure of the ash basin. The phreatic surface can be lowered and risks for contaminant migration are lowered when the leachate is collected and removed from the basin. The remaining wastes may avoid removal and transportation to an alternate site for disposal if the risks are reduced to an acceptable level.

The in situ treatment system also includes specialized wells to retain and filter solids from the recovered leachate. Controlling suspended solids from clogging the collector and damaging pump equipment is a key component of the in situ treatment system. The operation of the collectors may be concurrent with existing practices to manage leachate removal from the pond ash deposit and may be supplemented by adjoining groundwater recovery. The dewatered CCR solids will consolidate under their self-weight and will have improved strength and structural properties to support overfill of additional wastes or in situ closure. If necessary, dewatered CCR solids may be removed for secure disposal.

U.S. Pat. No. 6,351,900 discloses a shaft driven trencher that includes a mobile powered base, a boom assembly, a chain digging assembly, a drive assembly and a linkage. The boom assembly includes a first boom member pivotally mounted to the base at a first pivot and a second boom member pivotally mounted to the first boom member. The chain digging assembly has a plurality of buckets. The drive assembly operably interconnects the mobile base and the chain digging assembly, with the drive assembly including a drive shaft connected to the mobile base for powered rotation of the drive shaft. The drive assembly further includes a right angle gear unit with input and output shafts, with the right angle gear unit being pivotally mounted to the boom assembly for rotation about the output shaft. The linkage interconnects the right angle gear unit with the base and pivots the right angle gear unit during rotation of the first boom member. The linkage also maintains the input shaft of the right angle gear unit facing the first pivot.

U.S. Pat. No. 6,390,192 discloses an integral well filter and screen and method for making and using same. A first embodiment includes a perforated cylindrical well screen with a filter assembly in its interior. The filter assembly includes a pliable filter material bonded to a filter support. The filter support is a plastic lattice rigid enough to hold the shape of the filter assembly and keep the filter material in contact with the inner surface of the well screen, yet deformable enough that the filter assembly can be formed into a shape consistent with the interior of the well screen. A second embodiment includes a well screen with a filter made of a rigid, porous material placed inside the well screen. Because the filter is rigid, it needs no filter support. The method for the first embodiment includes bonding the filter support to the filter material, forming the filter assembly into a cylindrical shape complementary to the inner surface of the well screen, securing abutting edges of the filter assembly to maintain its shape and rigidity, and ensure complete filtration, and inserting the filter assembly into the well screen. The manufacture of the filter in the second embodiment is similar, but does not include the bonding of a filter support to the rigid porous material.

U.S. Patent Publication 2014/0255100 discloses a geosynthetic composite for filtration and drainage of fine-grained geomaterials that includes a geonet and a geotextile. The geotextile has a nonwoven fabric layer and a woven fabric layer, with the nonwoven fabric connected by needle-punching to the woven fabric whereby fibers of the nonwoven fabric extend through and beyond the woven fabric, and the woven fabric and fibers of the nonwoven fabric extending through the woven fabric are bonded to one side of the geonet.

The prior art to date does not disclose a system and method for dewatering and stabilizing coal combustion residuals or similar waste material deposits previously created from sluicing into an ash basin or coal combustion residual impoundment. None of the prior art can be combined in a way to suggest these necessary modifications. There is no teaching, suggestion, or motivation that would have enabled a person of ordinary skill in the art to modify any prior art to arrive at the present invention.

It is a primary object of the present invention to provide an in situ treatment system and method for dewatering and stabilization that removes leachate from the pond ash deposit and pond in situ.

Another object of the present invention is to provide an in situ treatment and method that reduces environmental risks associated with pond leachate.

Still another object of the present invention is to provide an in situ treatment system and method that consolidates and stabilizes pond ash solids.

Still another object of the present invention is to provide an in situ treatment system and method that allows the closed pond to be developed as an overfill landfill for added waste disposal.

SUMMARY OF THE INVENTION

The in situ treatment system and method of the present invention includes a method to dewater waste material deposits in situ and remove leachate from waste material deposits in the impoundments. The system uses specialized well filters installed in vertical dewatering wells to dewater soft, loose sluiced coal ash waste materials that are retained by an existing earthen embankment or impoundment. The method collects data related to the waste impoundment, including data and information related to the topography, hydrology, hydrogeology, phreatic surface and groundwater levels, environmental conditions, quantity of the waste and leachate, and chemical and physical properties of the waste and leachate. The method then gains access to the waste deposit by excavating, dredging, ditching, and/or grading the surface of the waste deposit and impoundment perimeter. If free water is present, the free water is siphoned or decanted from the impoundment. Removal of free water is a presumed condition and is considered primary dewatering.

Wells are installed in boreholes and completed with specified materials, such as well screen completion materials, and individual pumps. The boreholes for each well installation are drilled through the waste material deposit, where completion includes placement of the specified well screen completion materials within the well that is installed in the borehole. Leachate is filtered from the waste material deposit into the wells using well screen completion materials and is removed from the well into the collection piping network using a pump installed in proximity to the bottom of each vertical dewatering well. The leachate is then transmitted in a series of piping laterals and headers to a discharge solution. The piping laterals feed into the headers, which are the larger pipes that connect the plurality of laterals to a main and end at the discharge solution. The phreatic surface and contaminants are reduced to acceptable levels in the impoundment and the dewatered waste deposit is consolidated and stabilized. The method then performs a final grading, with the optional installation of a lateral underdrain system on the impoundment, and a final cover is installed over the waste material deposit to minimize continued leachate generation. The closed impoundment may be developed as an overfill landfill for additional waste storage over the waste material deposit. The dewatering system operation is necessary to implement closure of the waste material deposit with the option to extend operations as otherwise necessary. In another embodiment, the dewatering method and system may be applied as necessary to waste material deposits or impoundments with pre-existing final cover or overfill landfill.

BRIEF DESCRIPTION OF THE DRAWINGS

The following figures are included to better illustrate the embodiments of the devices and techniques of the present invention. In these figures, like numerals represent like features in the several views. It is to be noted that these figures, illustrating the several views of the present invention, unless stated to be otherwise, are not necessarily drawn to scale. Nor are the contents of the drawings to be considered as limiting the scope of the present invention as defined in the claims:

DETAILED DESCRIPTION OF THE ILLUSTRATED EMBODIMENTS

Figure 1:
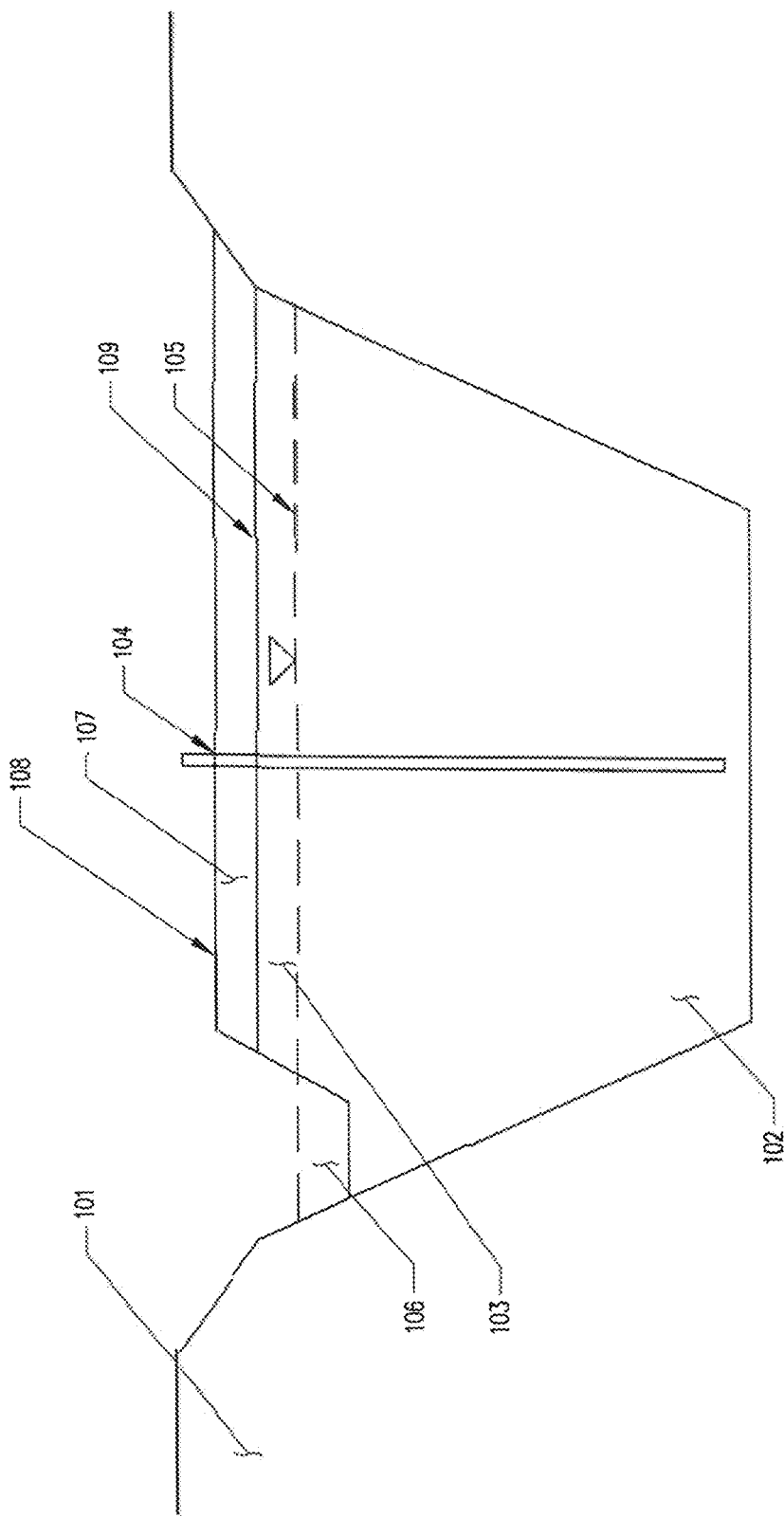
FIG. 1 is a cross-sectional view of an existing ash basin's characteristics, as seen in the prior art, including water, earthen, and pond ash surfaces, and a water level piezometer installed during site preparation.

The water level within constructed embankments and pond ash deposits is described as the phreatic surface, which may be connected to the local groundwater level in surrounding natural soils and bedrock. The in situ treatment system and method of the present invention combines existing and new technologies in a method to close the waste impoundment and manage environmental risk and remediation requirements. The presumed impoundment condition includes free water at the surface and removal of the free water is described as primary dewatering. The primary objectives of the in situ treatment system and method are to remove leachate from the pond ash deposit and pond, lower the phreatic surface, reduce environmental risks associated with pond leachate, and consolidate and stabilize pond ash solids. Dewatering and stabilization are required for pond ash closure in place and continued operation of an existing overfill landfill located over a historic pond ash deposit. Additionally, the closed pond may be developed as a new overfill landfill for added waste disposal.

The in situ treatment system and method includes a method to dewater the pond ash deposit in place and recover and collect the leachate. In a first embodiment, the in situ treatment system includes completion materials, individual well pumps, collection piping, outflow from the ash pond, and an impoundment final cover or cap. In a second embodiment, the in situ treatment system also includes groundwater recovery. In a third embodiment, the in situ treatment system also includes overfill landfill development. In a fourth embodiment, the in situ treatment system may be implemented as a retrofit to an existing closed or inactive impoundment, an existing overfill landfill, or for corrective action where a reduction in the source of contamination is necessary. The existing impoundment includes the ash basin with an existing overfill landfill, or the final cover is in-place over the pond ash deposit. The dewatering and stabilization system is retrofitted around or through the final cover or overfill landfill into an underlying or adjacent pond ash.

The in situ treatment system includes nine components: site characterization, site preparation, optional primary dewatering, pond ash dewatering wells, collection piping, secondary pond ash dewatering system operation, optional groundwater recovery well expansion, pond closure, and optional pond closure with overfill development or foundation improvements to existing overfills. Site preparation includes access for installation of wells and grading for surface drainage and storm water control. If free water is present in the existing pond, primary dewatering siphons and/or decants the free water in the pond. The pond ash dewatering well includes vertical installation that requires drilling, well completion materials for filtering leachate, and well pump installation for removing leachate from the dewatering wells. The collection piping collects leachate from the dewatering wells and transfers the leachate to a discharge solution. The dewatering operation collects and removes leachate from the pond ash deposit, reuses or treats the leachate through a discharge solution, remediates contaminants and/or hydraulic head in the impoundment, and consolidates and stabilizes the dewatered pond ash solids. Leachate reuse is limited to compaction of coal ash waste in a lined landfill facility. The groundwater recovery well expansion is an optional component that removes contaminated groundwater and controls perimeter groundwater levels around the pond. Pond closure includes final grading, pond final cover or cap installation where the cap minimizes continued leachate generation, and post closure. When the post closure plan includes added storage of CCR wastes in an overfill landfill, an optional underdrain system is added prior to the pond final cover. Post closure development of the closed pond as an overfill landfill or foundation improvements to existing overfills is an optional component with multiple improvements including pond ash dewatering and demonstrating the stability of the pond ash foundation to support overfill. Where necessary for overfill landfill development, an underdrain system is added prior to the pond final cover to control or maintain the water level and phreatic separation expected from increased overfill loading conditions that drive and squeeze water up in the underlying pond ash deposit. Once the final cover is completed over the impoundment, the impoundment is closed and post closure begins. After the impoundment is closed, the use of the closed pond for additional waste disposal is overfill landfill development. After the final cover is completed over the overfill landfill, the overfill landfill is closed and post closure of the overfill landfill begins, which includes at least final cover maintenance and environmental monitoring. Installation of the secondary dewatering collection system requires earth work that includes an initial fill, or push out, onto the existing ash pond to provide access for installation of the vertical well dewatering system. The well installation includes specially designed wells to remove the leachate from the pond ash deposit in situ. Perimeter ditching intercepts storm water run-on or directs pond run-off away from the pond ash deposit as part of dewatering activities. Primary dewatering is necessary when there is free water present in the existing pond or may be optional when the pond ash surface covers the entire area where in situ treatment wells are installed. Where there is free water in the pond, primary dewatering siphons or decants the water to a discharge solution.

Wells are installed to remove the leachate from the pond ash deposit. Well pumps remove leachate from the in situ treatment wells and transmit the leachate to a collection piping system. The collection piping system drains to a discharge solution, outside the discrete limits of the ash pond. Well installation includes the well screen completion materials and pump. In situ dewatering removes buoyancy effects in the pond ash deposit which consolidates the unsaturated CCR solids.

In an illustrated embodiment of the present invention, where the waste impoundment is an ash basin, the in situ treatment system includes dewatering wells constructed with a combination of specific materials to filter and minimize the suspended solids in the recovered leachate. The collection piping system is installed to collect and transmit leachate pumped from the wells to a discharge solution. The recovered leachate can be treated or reused. The method can include several components supporting or supplemental to the secondary dewatering system as described herein and not in any specific order.

In situ treatment system operation lowers the leachate level and phreatic surface in the pond ash deposit. The duration and extent of dewatering operations is site specific for pond closure. During operation, well pumping rates or cycle times are controlled to provide a uniform leachate level drawdown in the pond ash deposit. Piezometer water levels, rain gauge, and measurements from the wells provide data monitoring for operation effectiveness. Other measurements may be obtained to monitor consolidation of the dewatered pond ash solids, including cone penetrometer testing and settlement monuments. A final cover system or cap is required for pond closure to minimize the continued generation of leachate from rain water infiltration. The in situ treatment method may extend through the pond closure and into the post closure period.

Site characterization provides data and information used to design the site specific dewatering and stabilization system and typically includes but is not limited to: topography, hydrology, hydrogeology, phreatic surface and groundwater levels, environmental conditions, quantity of waste and leachate, and chemical and physical properties of the waste and leachate.

One aspect of the invention includes site preparation activities that are designed to gain access to the unstable pond ash areas and control the continued generation of new leachate during secondary dewatering. The purpose of site preparation for secondary dewatering is to provide equipment access for piezometer, well, and collection piping installations. Site preparation generally includes activities on and in the surficial pond ash zone and involves the disturbance and grading of ash materials. Grading or the import of fill materials may be necessary to bridge over the soft, saturated pond ash. Conventional earth work or dredging equipment is used to excavate, ditch, and grade the surface of the pond. Primary dewatering may include dredging, ditching, site specific grading and intermediate cover plans for the pond ash surface to gain equipment access, and segregation and removal of free water and storm water from the basin area. Perimeter ditching may be used to control storm water run-on into the pond. Site preparation may also include removal of free water from the basin and construction of water and waste treatment systems for use in the project.

Primary dewatering, if needed, is accomplished by siphoning or decanting the free water from the pond and directing the effluent to an approved discharge solution. Primary dewatering methods may also be used with conventional excavation and grading activities to remove leachate from the surficial pond ash depositions where contaminant mixing of leachate with the free water in the pond are not a concern to the discharge solution. When ditching and draining activities have been completed, primary dewatering methods may continue to be utilized through pond closure to remove free water from the pond surface.

Typically, site preparation and primary dewatering activities for the surficial pond and pond ash zone provide acceptable conditions for equipment access to install the secondary dewatering wellfield and collection system. The wellfield includes a plurality of wells and the collection system includes a network of collection piping. The installation removes leachate from within the saturated pond ash deposit at depths below the surficial zone in situ. After the initial removal of leachate with the secondary dewatering collection, maintenance and continued operation of site preparation components are incorporated in the in situ treatment system.

The in situ treatment system includes specialized wells installed in the pond ash deposit, the wells including completion materials designed to retain the pond ash solids and extract the pond leachate by pumping or gravity drainage. The vertical dewatering wells are designated as in situ treatment (IST) wells. Drilling rigs are used for the installation of boreholes to a depth just above the base of the pond ash deposit for vertical collection well completion. The spacing and type of collection wells are dependent on the ash basin characteristics and natural strata grades in the area surrounding the ash basin. The level of secondary dewatering is designed by the hydrogeologist and engineer to meet the environmental and structural criteria for pond closure and post closure.

Figures 7A, 7B:
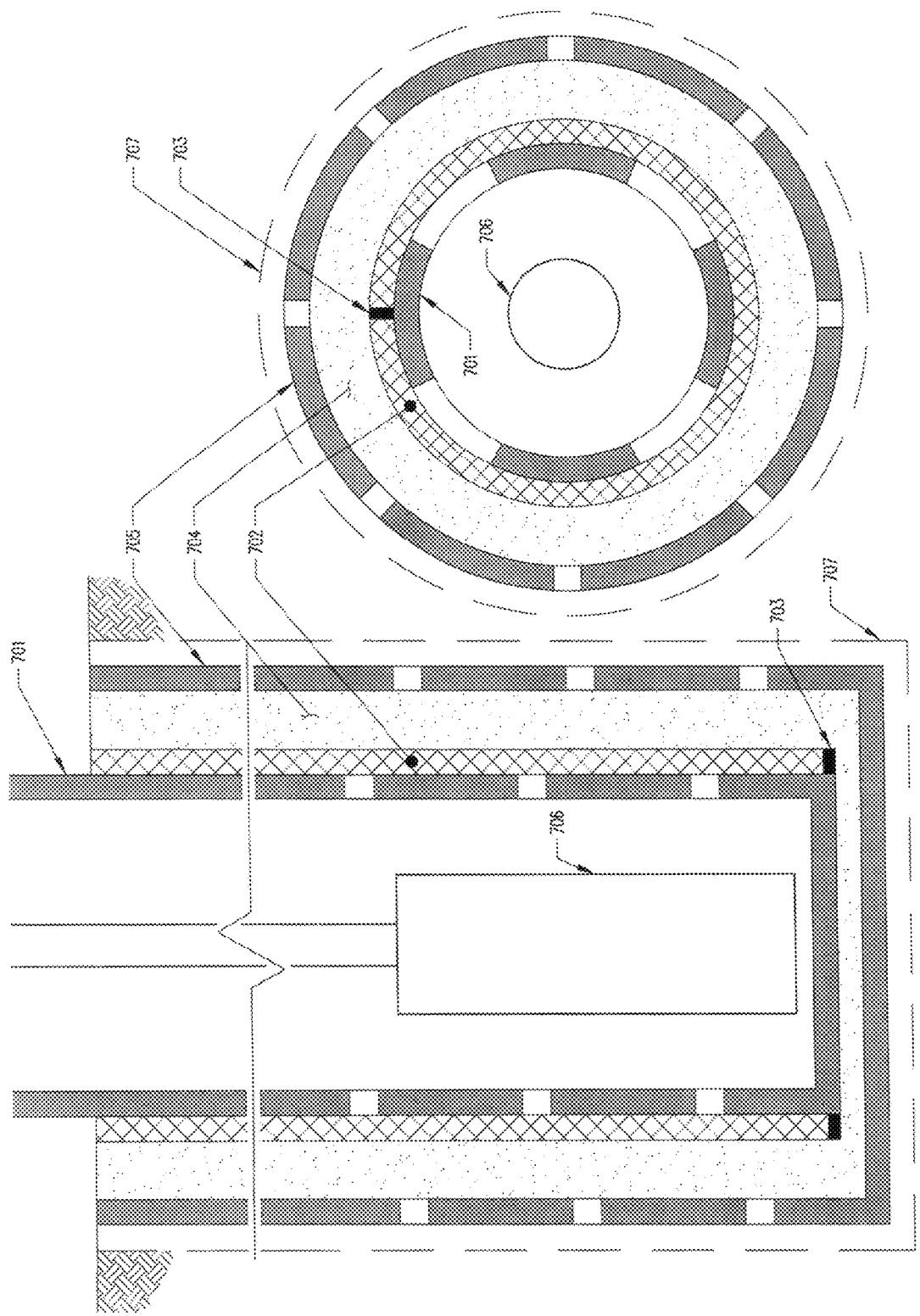
FIG. 7A is a side cross-section view of the well screen completion configuration installed in a borehole for a pond ash dewatering well.
FIG. 7B is a top plan view of the well screen completion configuration installed in a pond ash dewatering well.

One aspect of the invention is the combination of completion materials used in the IST wells. The well screen completion materials used in the IST wells include multiple layers to minimize migration of CCR fines from the pond ash deposit into the interior well casing, pumps, and collection system. The sand layer gradation and geotextile layer act together to prevent clogging of the well at the interior slotted or perforated casing comprising the well screen. The geotextile used around the well screen, as shown in FIGS. 7A and 7B comprises a specific double needle punched woven/nonwoven geotextile system. These completion materials may be installed in an outer perforated casing or in direct contact with the borehole and pond ash deposit.

Pumps installed in the IST wells remove and transmit the leachate to the collection system. The collection system transmits the leachate from the pond ash deposit to a discharge solution for necessary processing and treatment.

The in situ treatment system is operated to draw down and maintain the phreatic surface to the steady-state level or practical limit required by the engineer for pond closure and the site's specified end use. When the phreatic surface has reached steady-state or maximum drawdown, horizontal gravity drains may be installed with conventional cut and cover methods to replace or supplement the pumping IST wells. To maintain the lowered phreatic surface in the pond ash deposit, the horizontal drains may be collected in a vault and pumped or a drain may be installed to traverse through the basin embankment. Installation of the horizontal gravity drains through the basin embankment may also be added to the final dewatering system for closure.

Secondary dewatering may be supplemented by or implemented with methods for pumping and recovering groundwater upgradient of or adjacent to the pond ash deposit.

Intermediate cover and controls may be specified by the engineer to control water infiltration and new leachate generation during secondary dewatering.

Storm water controls and final cover are specified by the engineer for closure. If the site is to be developed as an overfill landfill, an underdrain system may be installed to maintain separation of the overfill liner system and the phreatic surface in the pond ash deposit. The requirements of the underdrain system are specified by the engineer for the site conditions and design configuration.

The in situ treatment method includes the steps of site characterization where data and information is collected and analyzed to create a dewatering plan for the ash pond closure and post-closure use, site preparation, primary dewatering and discharge system when free water is present in the existing pond, pond ash dewatering well installation and completion that includes well pumps, collection piping installation, in situ treatment system operation, optional groundwater recovery well expansion, pond closure, optional post closure and overfill post closure use, and in situ treatment system decommissioning. Pond closure and post closure includes final grading, pond final cover/cap installation, and post closure procedures. Overfill landfill development includes optional underdrain system installation, structural fill grading, pond final cover/cap installation, landfill overfill liner and leachate collection system, landfill waste disposal, operation, and construction, and landfill final cover and post closure.

The overfill landfill procedure is included in the third embodiment of the present invention where the post closure use is an overfill landfill and the in situ treatment process continues. In the third embodiment, the in situ treatment system functions to dewater the pond ash deposit to the extent practical, to consolidate the dewatered pond ash creating a stable foundation for overfill, and to maintain long term water level separation from the overfill liner system via the underdrain system installation step. The overfill landfill procedure includes the steps of optional underdrain system installation, structural fill grading, pond final cover/cap installation, landfill waste disposal, operation, and construction, and overfill landfill final cover and post closure. The overfill landfill process includes grading of the site to form the liner system for additional landfill disposal capacity. The liner used to close the impoundment can be of the same type as the liner used in the base of the overfill landfill.

Referring to FIG. 1, an existing ash basin or waste impoundment, as seen in the prior art, consists of saturated pond ash deposit 102 and adjoining natural foundation soils, rock, or constructed embankment 101, and the pond ash deposit surface 109 consists of drained unsaturated CCR 103 above the static phreatic surface 105 and the saturated pond ash deposit 102. Around the pond ash deposit, free water 106 is present in constructed ditches or open pond areas. Soil or other layers 107 may be present above the pond ash deposit surface 109 up to an existing top grade 108. A monitoring piezometer 104 is installed to a depth near the base of the saturated pond ash deposit 102.

Figure 2:
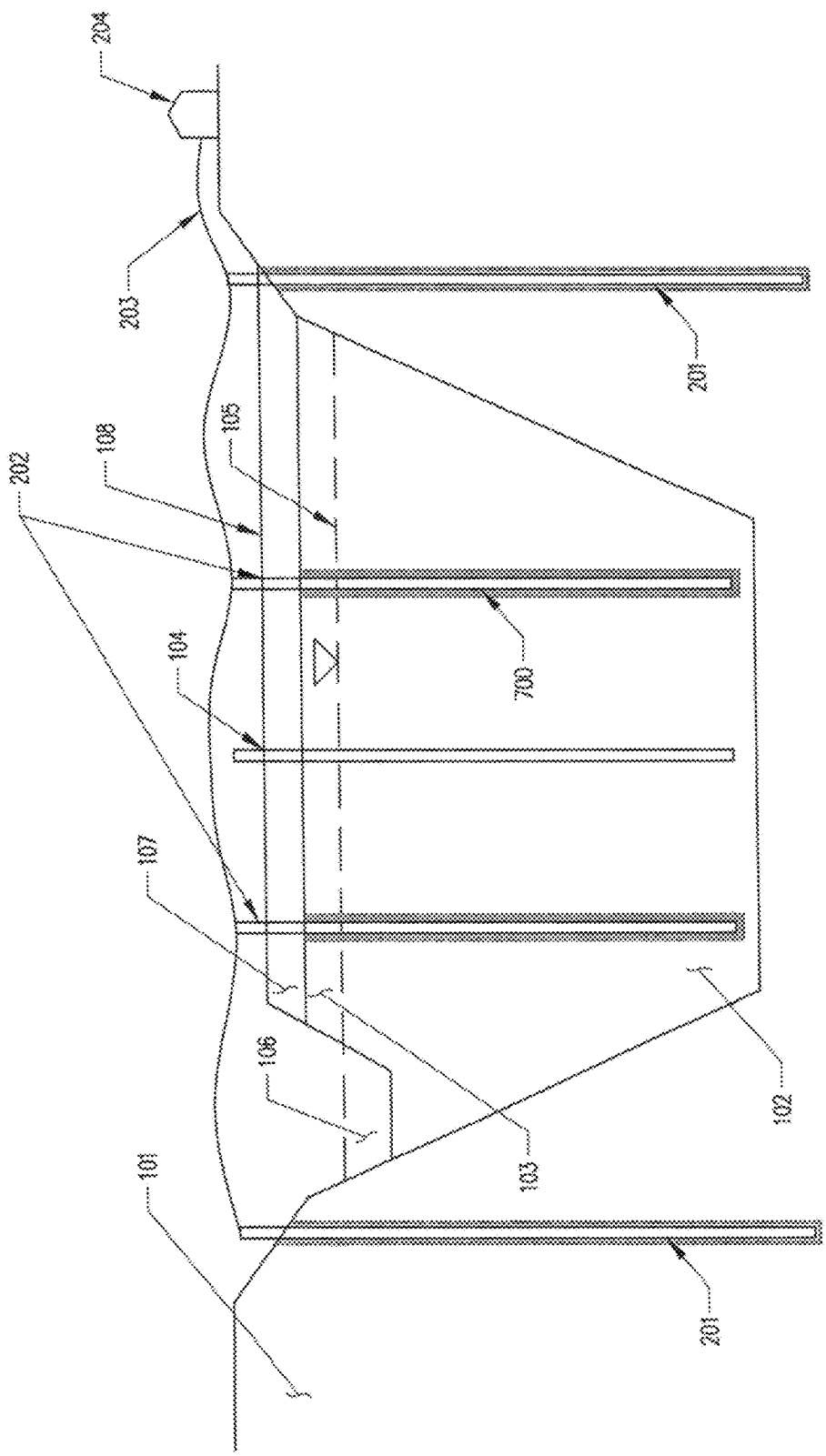
FIG. 2 is a cross-sectional view of an existing ash basin with piezometers, vertical dewatering wells, and optional groundwater recovery wells installed prior to active dewatering.

Referring to FIG. 2, the vertical dewatering collection system consists of pond ash dewatering wells 202 constructed with well completion materials 700, optional vertical groundwater recovery wells 201, and a pump and network of collection piping 203. The well completion materials 700 comprise the completed dewatering well and well screen as shown in FIGS. 7A and 7B. The collected leachate is routed to a discharge solution 204. The ash basin cross section in FIG. 1 is illustrated as background with the initial phreatic surface 105 shown prior to start of dewatering.

Figure 3:
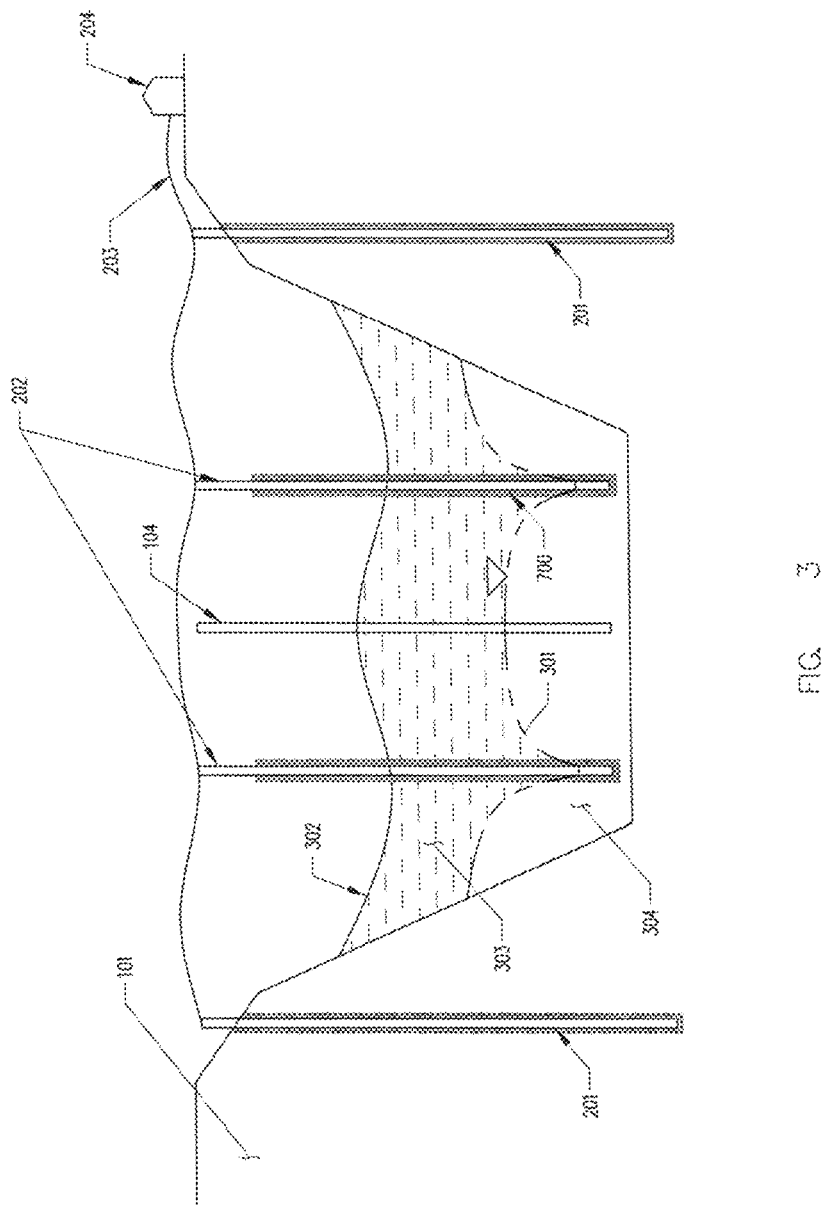
FIG. 3 is a cross-sectional view of an existing pond ash deposit during active dewatering with an increasing unsaturated and consolidated CCR layer, lowered phreatic surface, and settled pond ash surface.

Referring to FIG. 3, the in situ treatment system is active and lowers phreatic surface 301. Removal of the leachate from the pond ash deposit increases the thickness of the overlying dewatered and unsaturated CCR zone 303. The drawdown rate of the phreatic surface 301 is controlled during the dewatering period and monitored by the piezometers 104 and dewatering wells. As the phreatic surface 301 within the pond ash deposit 304 is gradually lowered, the drawdown induces consolidation, settlement, and stability improvements in the dewatered CCR zone 303. Consolidation of the dewatered CCR zone 303 layers creates a lowered or settled CCR surface 302.

Figure 4:
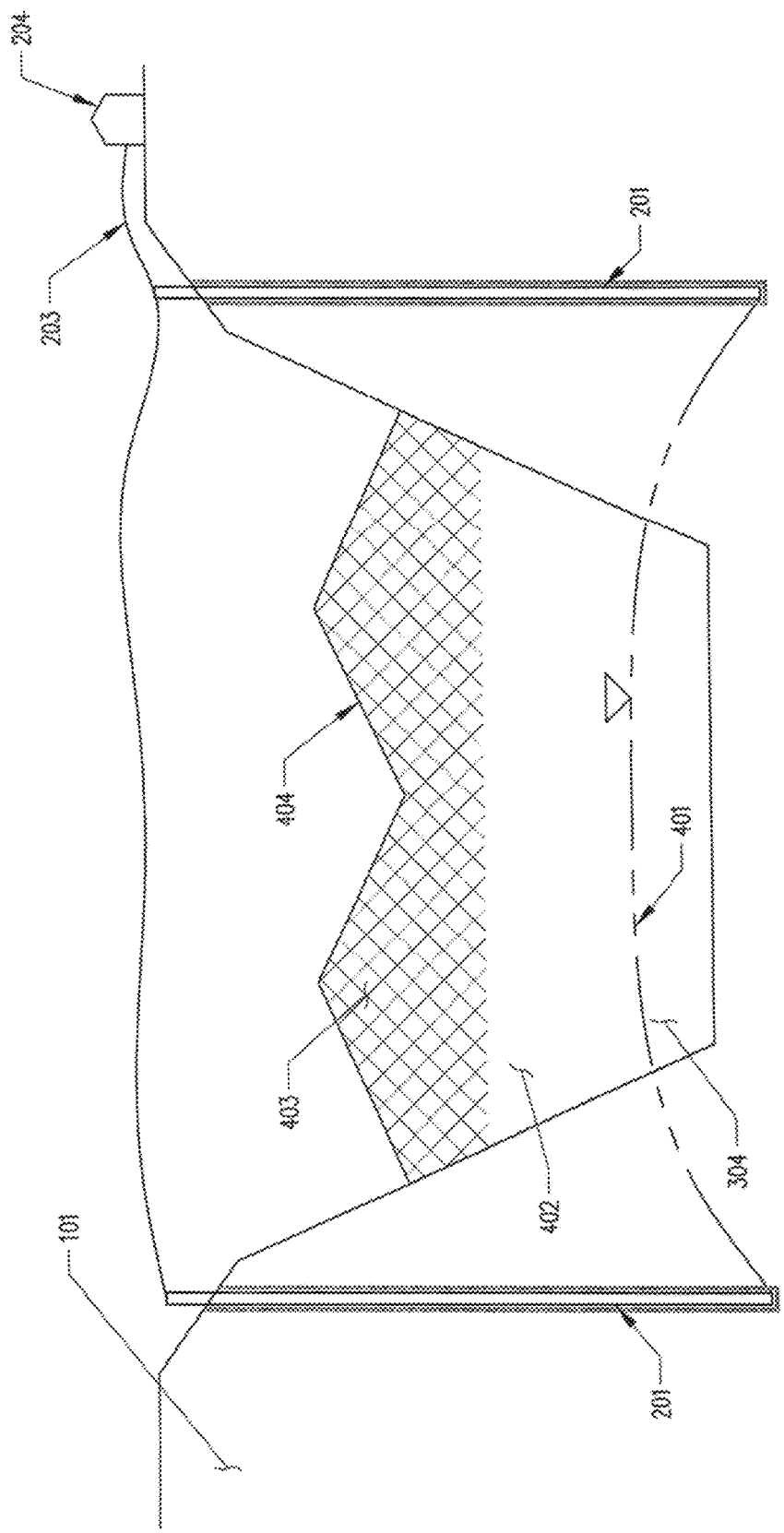
FIG. 4 is a cross-sectional view of the steady-state and stabilized ash basin conditions including optional groundwater recovery wells and grading of the surface prior to closure.

FIG. 4 illustrates the stabilized condition of the pond ash deposit when the operation of the dewatering wells reaches the steady state condition, with the optional operation of the vertical groundwater recovery wells 201. The steady-state phreatic surface 401 has increased the total thickness of the improved dewatered CCR zone 402. Grading the dewatered pond ash materials or structural fill 403 establishes the final grade 404 conditions prior to closure of the ash basin.

Figure 5:
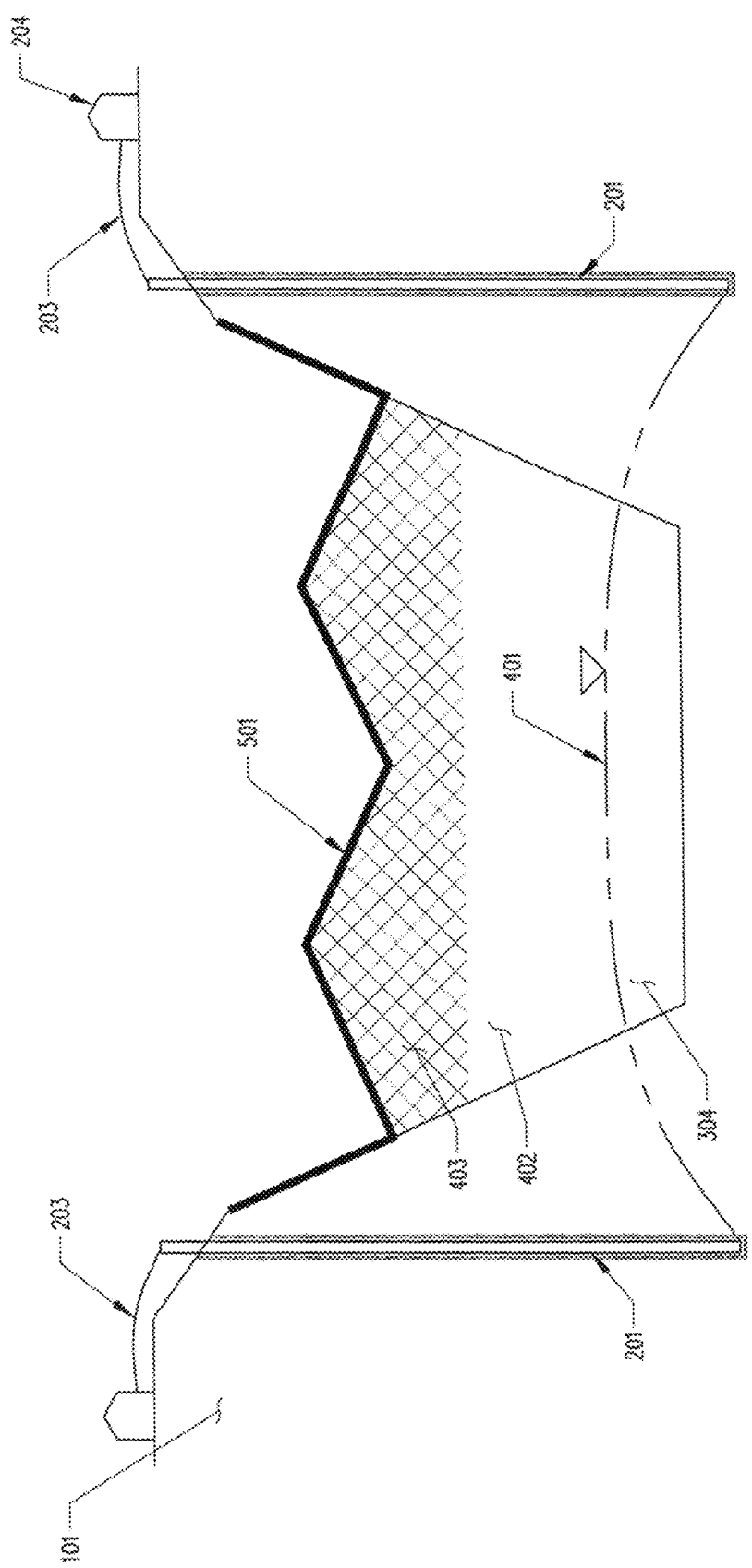
FIG. 5 is a cross-sectional view of the ash basin with a cap and closure system limiting infiltration into the dewatered pond ash deposit.

FIG. 5 illustrates the closure condition of the ash basin that includes a final cover cap and closure system 501.

Figure 6:
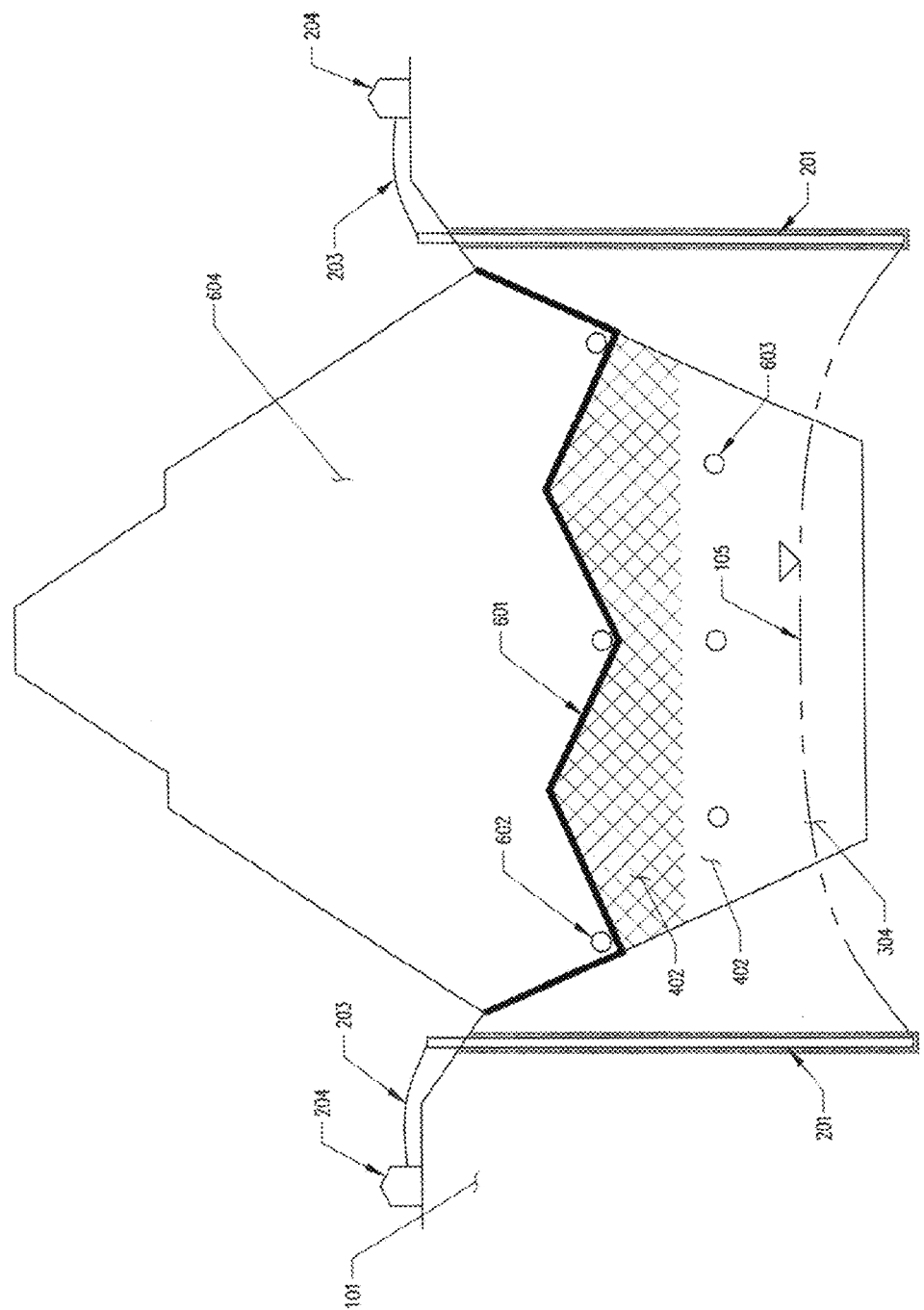
FIG. 6 is a cross-sectional view of the closed ash basin that is developed for future CCR storage as an overfill landfill, and including an underdrain system.

FIG. 6 illustrates closure and post closure of the ash basin and the development of an overfill landfill adding supplemental controls and disposal or storage capacity. The liner system 601 typically consists of barrier and leachate collection 602 and protective cover components. In the overfill configuration, an optional underdrain system 603 is installed below the liner system, maintaining vertical separation from the underlying phreatic surface during overfill loading conditions 604.

FIGS. 7A and 7B illustrate the well screen completion materials used in the IST vertical dewatering well consisting of multiple layers to filter and minimize migration of pond ash fines into the well. The sand filter layer 704 and the geotextile filter layer 702 around the well screen 701 act together to filter suspended solids from the leachate entering the well screen 701 which optimizes dewatering performance and well efficiency.

The geotextile filter layer 702 used around the inner perforated or slotted casing well screen 701 consists of a specified double-layered, needle punched woven/nonwoven geotextile material. The geotextile filter layer 702 is installed with intimate contact to the well screen 701 and is heat welded or chemically bonded 703 at the ends of the lengths of the inner slotted or perforated well screen 701 segments, such that the perforations or slots are covered, and along the length of the geotextile filter layer 702 where the overlap of the geotextile occurs. The heat welding 703 is such that the geotextile filter layer 702 is bonded or held firm to the well screen 701 and to the geotextile filter layer 702. The geotextile filter layer 702 portion of the filter system is non-biodegradable, non-reactive within a pH range from three to eleven, and has a maximum apparent opening size (AOS) ranging from 0.075 mm to 0.106 mm. The geotextile filter layer 702 is the second filter between the sand filter layer 704 and the well screen 701. The geotextile filter layer 702 and the sand filter layer 704 have an adequate system permeability to maintain leachate flow into the well screen 701, with a typical required permeability greater than $1 \times 10^{-4}$ cm/sec.

The outer casing 705 may be a necessary component to ensure the integrity of the sand filter layer 704 when bottom heaving is observed in the borehole 707. If the well is completed without the outer casing 705 in the open borehole 707, then the sand filter layer 704 would have to be installed by gravity or tremie methods, after the inner casing 701 and geotextile filter layer 702 are installed in the borehole. The sand filter layer 704 provides the primary granular filter layer that is in contact with the pond ash deposit waste. The geotextile filter layer 702 is bonded to the inner casing 701 and is specifically designed as a final filter to retain fines in the sand filter layer 704 and allow the leachate to flow into the inner casing 701. The inner casing 701 is a conventional slotted or perforated plastic pipe, such as PVC pipe. The well pump 706 is a conventional pneumatic or electric powered pump.

The sand filter layer 704 of the well screen includes a well graded sand product that meets the gradation criteria for the saturated pond ash deposit 102. Gradation criteria for the sand filter layer 704 includes mixtures of commercially available fine aggregate determined by the engineer using standards developed by National Resource Conservation Service (NRCS) for filter ratio criteria for the gradation diameters of the protected material and the filter materials. The NRCS method, or equivalent method, is used to determine the required gradation of the sand filter layer 704. Typically, American Society for Testing Materials (ASTM) C-33, fine Aggregate, or blending with other sand products will form the sand filter layer 704. The geotextile filter layer 702 provides final filtration of leachate to minimize clogging and migration of fines in the inner casing 701 and maintains adequate drainage into the inner casing. The sand filter layer 704 and geotextile filter layer 702 combine to create a dual filter system to retain fines migrating from the pond ash deposit to the well. Retention of the pond ash fines minimizes clogging of the apertures in the inner casing 701, siltation into the inner casing 701, and damage to the well pump 706 from abrasive particles in the leachate, which improves the effectiveness of the dewatering well installation and extends its service life.

Figure 8:
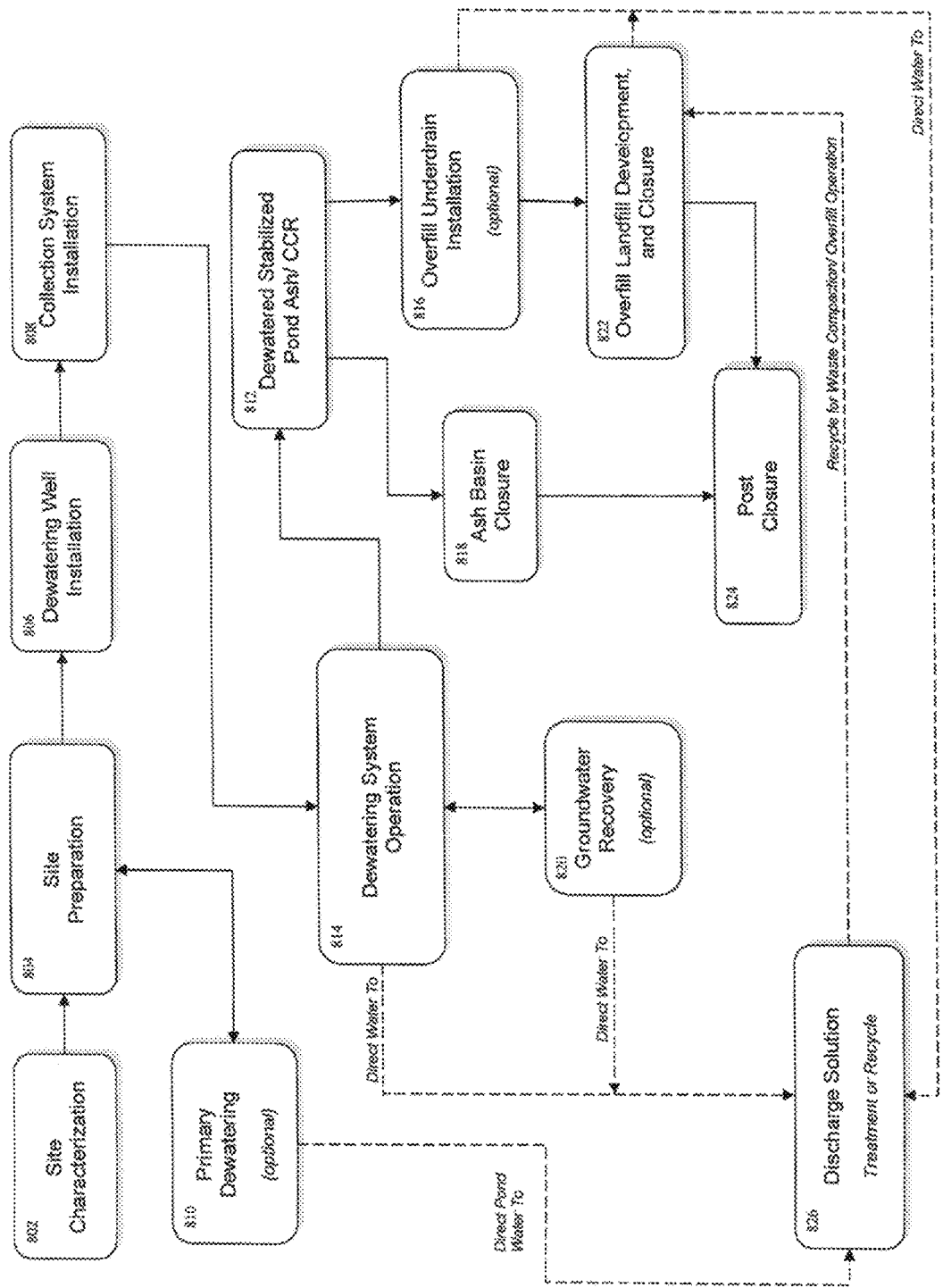
FIG. 8 is a flow diagram depicting the process for implementing the in situ treatment system and method of the present invention.

FIG. 8 is a flow diagram depicting the process for implementing the in situ treatment system and method of the present invention. Site characterization 802 evaluates the impoundment and site preparation 804 is then performed on the impoundment. After site preparation 804, primary dewatering 810 is performed if free water is present in the impoundment and the free water is directed to a discharge solution 826.

Then, the dewatering well is installed 806 and the collection system is installed 808. The dewatering system operation 814 begins and water is directed to a discharge solution 826. Optionally, groundwater recovery 820 directs water to a discharge solution 826. The dewatering system operation 814 produces dewatered stabilized pond ash for either an ash basin closure 818 or an overfill landfill development 822 which includes an optional precedent step for installation of an underdrain system 816. Overfill landfill development incorporates a pond closure step, improvements for additional waste disposal, and a final cover. Leachate from the underdrain system or from the overfill landfill is directed to the discharge solution 826. The discharge solution 826 may include recycling of leachate to the overfill landfill for waste compaction and disposal. Post closure 824 begins when closure of the ash basin 818 or overfill landfill 822 is completed. The dewatering system operation 814 may extend through closure activities and into the post closure period as necessary.

The foregoing description of an illustrated embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed:

1. A method to dewater an extant stationary waste material deposit comprising an amount of waste material stored in a waste impoundment by removing particle-containing leachate from the extant stationary waste material deposit at depths below the phreatic surface in situ, said leachate removal improving the extant stationary waste material deposit for at least one of waste stability, waste removal, structural integrity, and/or reduction in the source of environmental contamination, the method comprising the steps of:

installing a plurality of vertical dewatering wells in boreholes constructed in the extant stationary waste material deposit, wherein the extant stationary waste material deposit substantially fills the waste impoundment, each vertical dewatering well having an apertured well screen located within the vertical dewatering well;

installing at least one of specialized completion materials around the well screen and within each of the vertical dewatering wells, each well screen adapted to filter particles suspended in the leachate, which particles are drained from the extant stationary waste material deposit, to prevent clogging of the at least one completion materials and the apertures in the well screen, wherein the at least one specialized completion material is selected from the group consisting of:

at least one geotextile filter layer system in intimate contact with the outer circumference of the well screen, and a sand layer disposed around the at least one geotextile filter layer system;

at least one geotextile filter layer system in intimate contact with the outer circumference of the well screen;

at least two geotextile filter layers in intimate contact with the outer circumference of the well screen and a sand layer disposed around the at least two geotextile filter layers;

at least two geotextile filter layers in intimate contact with the well screen;

a geotextile filter layer in intimate contact with the outer circumference of the well screen and a sand layer disposed around the geotextile filter layer;

a geotextile filter layer in intimate contact with the outer circumference of the well screen; and a sand layer in intimate contact with the well screen;

installing and extending the well screen and at least one specialized completion material through the vertical dimension of the extant stationary waste material deposit; and installing at least one well pump in each vertical dewatering well, the well pump in each vertical dewatering well adapted to concurrently remove the leachate from each vertical dewatering well at a controlled rate and create radial leachate flow through a saturated depth of the extant stationary waste material deposit to the vertical dewatering wells, and a gradual leachate level drawdown in the extant stationary waste material deposit wherein the at least one well pump is installed at a depth below the phreatic surface.

2. The method of claim 1, further comprising the step of: collecting data related to the waste material deposit, said data including:
one of:
a quantity of waste and a quantity of leachate; and
at least one of a quantity of waste and a quantity of leachate; and
one of:
topography, hydrology, hydrogeology, waste thickness, phreatic surface and groundwater levels, environmental conditions, and chemical and physical properties of the waste and leachate; and
at least one of topography, hydrology, hydrogeology, waste thickness, phreatic surface and groundwater levels, environmental conditions, and chemical and physical properties of the waste and leachate.

3. The method of claim 1, further comprising the step of: gaining access to the extant stationary waste material deposit, said access achieved using one of:
excavating, dredging, ditching, and grading a surface of the extant stationary waste material deposit; and
at least one of excavating, dredging, ditching, and grading a surface of the extant stationary waste material deposit.

4. The method of claim 1, further comprising the step of: adding at least one of coal combustion residuals and fill materials to a surface of the extant stationary waste material deposit, the at least one of the coal combustion materials and the fill materials adapted to provide access for installing the plurality of vertical dewatering wells.

5. The method of claim 4, further comprising the step of preparing the extant stationary waste material deposit to receive the plurality of vertical dewatering wells by adding said at least one of coal combustion materials and fill materials to the surface of the extant stationary waste material deposit.

6. The method of claim 1, further comprising the step of one of:
installing a plurality of piezometers in the extant stationary waste material deposit, said plurality of piezometers adapted to measure water levels in the extant stationary waste material deposit, and measuring water level data to gauge the rate of leachate removal from the extant stationary waste material deposit; and
installing the plurality of piezometers in the extant stationary waste material deposit, said plurality of piezometers adapted to measure one of water levels in the extant stationary waste material deposit, and water level data to gauge the rate of leachate removal from the extant stationary waste material deposit.

7. The method of claim 1, further comprising the step of: grading one of:
the extant stationary waste material deposit and a perimeter of the extant stationary waste material deposit; and
one of the extant stationary waste material deposit and a perimeter of the extant stationary waste material deposit; and
said grading adapted to allow one of:
surface drainage and run-on control from adjoining areas above the extant stationary waste material deposit; and
one of surface drainage from adjoining areas above the waste material deposit and run-on control from adjoining areas above the extant stationary waste material deposit.

8. The method of claim 1, further comprising the step of one of:
siphoning and decanting free water adjacent to the extant stationary waste material deposit when free water is present; and
one of siphoning and decanting free water adjacent to the extant stationary waste material deposit when free water is present.

9. The method of claim 1, further comprising the step of: removing a quantity of leachate from the extant stationary waste material deposit.

10. The method of claim 1, further comprising the step of: installing at least one groundwater recovery well adapted to improve stabilization of the phreatic water surface in the extant stationary waste material deposit.

11. The method of claim 1, further comprising the step of: consolidating and stabilizing the extant stationary waste material deposit in the waste impoundment.

12. The method of claim 1, further comprising the step of: lowering the phreatic surface in the extant stationary waste material deposit, said lowering adapted for one of:
waste stability, consolidation of solids, and improving environmental conditions; and
at least one of waste stability, consolidation of solids, and improving environmental conditions.

13. The method of claim 1, further comprising the steps of:
grading the extant stationary waste material deposit for closure; and
installing a final cover over the extant stationary waste material deposit, said final cover adapted to minimize continued leachate generation.

14. The method of claim 1, further comprising the steps of:
installing an underdrain system in the extant stationary waste material deposit for post closure use of the extant stationary waste material deposit;
grading the extant stationary waste material deposit for closure; and
installing a final cover over the extant stationary waste material deposit, said final cover adapted to minimize continued leachate generation.

15. The method of claim 1, further comprising the steps of:
dewatering, consolidating, and stabilizing the extant stationary waste material deposit and preparing for closure of the extant stationary waste material deposit, said closed extant stationary waste material deposit adapted to be used as an overfill landfill;
grading the extant stationary waste material deposit for closure of the waste impoundment and for use as the foundation for the overfill landfill;
installing an overfill landfill liner over the extant stationary waste material deposit;
placing and compacting at least one waste layer in the overfill landfill.

16. The method of claim 15, further comprising the step of installing a leachate collection system above the overfill landfill liner, and collecting leachate dewatered from one of the extant stationary waste material deposit and the leachate collection system, the collected leachate being recycled to the overfill landfill to condition a moisture content in ash placed for compaction in the at least one waste layer in the overfill landfill.

17. The method of claim 1, further comprising the step of:
removing the leachate from the extant stationary waste material deposit, said removal adapted to improve the quality of the groundwater adjacent to the waste impoundment.

18. The method of claim 1, further comprising the step of: directing the leachate to flow to a discharge solution.

19. The method of claim 1, further comprising the step of transmitting the leachate to a discharge solution for treatment of the leachate.

20. The method of claim 1, further comprising the steps of:
remediating one of:
contaminants and hydraulic head of the extant stationary waste material deposit; and
one of contaminants and hydraulic head of the extant stationary waste material deposit;
consolidating and stabilizing the phreatic surface of the extant stationary waste material deposit;
grading the extant stationary waste material deposit; and
installing a cover over the extant stationary waste material deposit, said cover adapted to minimize continued leachate generation.

21. The method of claim 1, further comprising the steps of:
removing contaminated groundwater using a groundwater recovering well to control groundwater levels around a perimeter of the extant stationary waste material deposit.

22. The method of claim 1, wherein the depth of at least one vertical dewatering well of the plurality of vertical dewatering wells is down to the base of the extant stationary waste material deposit, the at least one vertical dewatering well of the plurality of vertical dewatering wells adapted to extract leachate from a depth of down to the base of the extant stationary waste material deposit.

23. The method of claim 1, further comprising the step of installing an outer casing in each of the boreholes, the outer casing in contact with the extant stationary waste material deposit prior to installing one of:
the well screen and the specialized completion materials; and
one of the well screen and the specialized completion materials;
in an interior portion of said outer casing.

24. The method of claim 1, wherein:
the at least one well pump is installed in proximity to the bottom of each vertical dewatering well.

25. The method of claim 1, further comprising the steps of:
collecting the leachate dewatered from the extant stationary waste material deposit and at least one of disposing of the leachate in a lined landfill and using the collected leachate from the extant stationary waste material to condition a moisture content in ash placed for compaction in the lined landfill.

26. A system to dewater an extant stationary waste material deposit comprising an amount of waste material stored in a waste impoundment by removing particle-containing leachate from the extant stationary waste material deposit at depths below the phreatic surface in situ, said leachate removal improving the extant stationary waste material deposit for at least one of waste stability, waste removal, structural integrity, and/or reduction in the source of environmental contamination, the system comprising:
a plurality of vertical dewatering wells in boreholes constructed in the extant stationary waste material deposit, wherein the existing extant stationary waste material deposit substantially fills the waste impoundment, each of the plurality of vertical dewatering wells including a well screen within each vertical dewatering well, the well screen having a plurality of apertures;
at least one specialized completion material disposed around the apertured well screen of each vertical dewatering well, the at least one specialized completion material adapted to filter suspended solid particles from the leachate prior to the leachate entering the apertures of the well screen of each vertical dewatering well, wherein the at least one specialized completion material is selected from the group consisting of:
at least one geotextile filter layer system in intimate contact with the outer circumference of the well screen, and a sand layer disposed around the at least one geotextile filter layer system;
at least one geotextile filter layer system in intimate contact with the outer circumference of the well screen;
at least two geotextile filter layers in intimate contact with the outer circumference of the well screen and a sand layer disposed around the at least two geotextile layers;
at least two geotextile filter layers in intimate contact with the well screen;
a geotextile filter layer in intimate contact with the outer circumference of the well screen and a sand layer disposed around the geotextile filter layer;
a geotextile filter layer in intimate contact with the outer circumference of the well screen and
a sand layer in intimate contact with the well screen;
the well screen and at least one specialized completion material extending through the vertical dimension of the extant waste material;
at least one well pump in each vertical dewatering well, the well pump in each vertical dewatering well adapted to concurrently remove the leachate from each vertical dewatering well at a controlled rate and create radial leachate flow through a saturated depth of the extant stationary waste material deposit into the vertical dewatering wells, wherein the at least one well pump is located at a depth below the phreatic surface; and
a discharge solution fluidly connected to said at least one well pump.

27. The system of claim 26, further comprising at least one piezometer adapted to measure water levels in the extant stationary waste material deposit.

28. The system of claim 26, further comprising at least one groundwater recovery well adapted to improve stabilization of the phreatic water surface in the impoundment.

29. The system of claim 26, further comprising an underdrain system located above the phreatic surface upon removal of the leachate from below the phreatic surface.

30. The system of claim 26, further comprising one of:
an overfill landfill liner over the extant stationary waste material deposit, a leachate collection system located over the overfill landfill liner, and added waste material.

31. The system of claim 26, further comprising a final cover over one of:
an overfill landfill and the extant stationary waste material deposit; and
one of an overfill landfill and the extant stationary waste material deposit.

32. The system of claim 26, wherein each vertical dewatering well includes:
an apertured outer well casing.

33. The system of claim 26, wherein the depth of at least one vertical dewatering well of the plurality of vertical dewatering wells is down to the base of the extant stationary waste material deposit, the at least one vertical dewatering well of the plurality of vertical dewatering wells adapted to extract leachate from a depth of down to the base of the extant stationary waste material deposit.

34. The system of claim 26, wherein the at least one geotextile filter layer system, the at least two geotextile filter layers, and the geotextile filter layer each include a plurality of apertures having an apparent opening size (AOS) no greater than 0.106 mm.

35. The system of claim 26, further comprising:
a collection pipe network having at least one collection pipe in communication with the at least one well pump via flexible tubing, the collection pipe network adapted to transmit the leachate from each vertical dewatering well to the discharge solution.

36. The system of claim 26, wherein the at least one geotextile filter layer system and the at least two geotextile filter layers include a hybrid double layer geotextile.

37. The system of claim 26, wherein the at least one well pump is located in proximity to the bottom of each vertical dewatering well.

38. The system of claim 26, wherein the leachate in the discharge solution is recycled to a lined landfill, the recycled leachate conditioning a moisture content in compacted ash in the lined landfill.

* * * * *

UNITED STATES PATENT AND TRADEMARK OFFICE
CERTIFICATE OF CORRECTION

Page 1 of 1

PATENT NO. : 9,732,492 B2
APPLICATION NO. : 15/381791
DATED : August 15, 2017
INVENTOR(S) : Gary Ahlberg, William Lupi and Nicholas Parks It is certified that error appears in the above-identified patent and that said Letters Patent is hereby corrected as shown below:

On the Title Page

In the title and in the Specification, in Column 1, Lines 1-4, "SITU TREATMENT SYSTEM AND METHOD FOR DEWATERING AND STABILIZATION OF WASTE MATERIAL DEPOSITS IN WASTE IMPOUNDMENTS" should be --IN SITU TREATMENT SYSTEM AND METHOD FOR DEWATERING AND STABILIZATION OF WASTE MATERIAL DEPOSITS IN WASTE IMPOUNDMENTS--.

Signed and Sealed this
Third Day of October, 2017

Joseph Matal
*Performing the Functions and Duties of the*
*Under Secretary of Commerce for Intellectual Property and*
*Director of the United States Patent and Trademark Office*